(12) United States Patent
Bednarczyk et al.

(10) Patent No.: US 9,253,340 B2
(45) Date of Patent: Feb. 2, 2016

(54) WIRELESS CAMERA WITH IMAGE SHARING PRIORITIZATION

(75) Inventors: John M. Bednarczyk, Fairport, NY (US); Mark D. Wood, Penfield, NY (US); Frank William Armstrong, Rochester, NY (US); Gregory R. Bryniarski, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 374 days.

(21) Appl. No.: 13/294,212

(22) Filed: Nov. 11, 2011

(65) Prior Publication Data

US 2013/0120591 A1 May 16, 2013

(51) Int. Cl.
*H04N 7/00* (2011.01)
*H04N 1/00* (2006.01)
*H04N 1/21* (2006.01)
*H04N 1/333* (2006.01)
*H04W 48/18* (2009.01)
(Continued)

(52) U.S. Cl.
CPC ............ *H04N 1/00153* (2013.01); *H04L 45/12* (2013.01); *H04N 1/00137* (2013.01); *H04N 1/00156* (2013.01); *H04N 1/00204* (2013.01); *H04N 1/00217* (2013.01); *H04N 1/00347* (2013.01); *H04N 1/00408* (2013.01); *H04N 1/2112* (2013.01); *H04N 1/33323* (2013.01); *H04N 1/33353* (2013.01); *H04N 1/33361* (2013.01); *H04N 1/33376* (2013.01); *H04W 48/18* (2013.01); *H04N 2101/00* (2013.01); *H04N 2201/006* (2013.01); *H04N 2201/0036* (2013.01); *H04N 2201/0055* (2013.01); *H04N 2201/0084* (2013.01)

(58) Field of Classification Search
CPC .......... H04N 1/00204; H04N 1/00214; H04W 48/18; G06F 21/30
USPC ............... 348/14.02, 21, 207.1, 231.3, 231.6; 455/3.06, 435.3, 512, 513; 725/105
See application file for complete search history.

(56) References Cited

U.S. PATENT DOCUMENTS 3,971,065 A 7/1976 Bayer
4,642,678 A 2/1987 Cok
(Continued)

FOREIGN PATENT DOCUMENTS

EP 2 264 980 12/2010
WO 2009125108 10/2009
WO WO 2011/036966 3/2011

OTHER PUBLICATIONS

"Samsung announces SH100 Wi-Fi enabled compact camera," Jan. 4, 2011, http://www.dpreview.com/news/1101/11010403samsungsh100.asp.

(Continued)

*Primary Examiner* — Nhan T Tran
*Assistant Examiner* — Chriss Yoder, III

(57) ABSTRACT

A digital camera, comprising an image sensor and an optical system for capturing an image of a scene and a wireless communication system. User interface elements are provided enabling a user to select a sharing destination for a captured digital image. A plurality of network pathways are identified for communication with the sharing destination using the wireless communication system. A priority is determined for each of the network pathways and the digital image is transmitted to the sharing destination using the highest priority network pathway.

21 Claims, 8 Drawing Sheets

(51) Int. Cl.
*H04L 12/721* (2013.01)
*H04N 101/00* (2006.01)

(56) References Cited

U.S. PATENT DOCUMENTS

| | | | |
|---|---|---|---|
| 4,774,574 A | 9/1988 | Daly et al. | |
| 4,975,969 A | 12/1990 | Tal | |
| 5,189,511 A | 2/1993 | Parulski et al. | |
| 5,493,335 A | 2/1996 | Parulski et al. | |
| 5,652,621 A | 7/1997 | Adams, Jr. et al. | |
| 5,668,597 A | 9/1997 | Parulski et al. | |
| 5,900,909 A | 5/1999 | Parulski et al. | |
| 6,192,162 B1 | 2/2001 | Hamilton, Jr. et al. | |
| 6,292,218 B1 | 9/2001 | Parulski et al. | |
| 6,430,161 B2* | 8/2002 | Uemura et al. | 370/252 |
| 6,430,624 B1* | 8/2002 | Jamtgaard et al. | 709/246 |
| 6,741,864 B2 | 5/2004 | Wilcock et al. | |
| 6,750,902 B1 | 6/2004 | Steinberg et al. | |
| 6,784,924 B2 | 8/2004 | Ward et al. | |
| 6,853,461 B1* | 2/2005 | Shiimori | 358/1.15 |
| 6,934,056 B2 | 8/2005 | Gindele et al. | |
| 6,940,545 B1 | 9/2005 | Ray et al. | |
| 7,027,084 B1 | 4/2006 | Watanabe | |
| 7,034,871 B2 | 4/2006 | Parulski et al. | |
| 7,058,409 B2 | 6/2006 | Hanninen et al. | |
| 7,092,010 B2 | 8/2006 | Iida | |
| 7,221,520 B2 | 5/2007 | Dowling et al. | |
| 7,256,823 B2 | 8/2007 | Ward et al. | |
| 7,433,710 B2 | 10/2008 | Bodnar et al. | |
| 7,468,744 B2 | 12/2008 | Edwards et al. | |
| 7,526,314 B2 | 4/2009 | Kennedy | |
| 7,542,077 B2 | 6/2009 | Miki | |
| 7,551,210 B2 | 6/2009 | Katayama | |
| 7,599,527 B2 | 10/2009 | Shah et al. | |
| 7,605,846 B2 | 10/2009 | Watanabe | |
| 7,633,524 B2 | 12/2009 | Clemente et al. | |
| 7,916,326 B2 | 3/2011 | Edwards et al. | |
| 7,936,391 B2 | 5/2011 | Ward et al. | |
| 8,156,442 B2* | 4/2012 | Aoki et al. | 715/753 |
| 8,166,098 B1* | 4/2012 | Reardon | 709/202 |
| 2002/0120766 A1* | 8/2002 | Okajima et al. | 709/232 |
| 2002/0154221 A1 | 10/2002 | Ishimaru | |
| 2003/0004916 A1 | 1/2003 | Lewis | |
| 2003/0103144 A1 | 6/2003 | Sesek et al. | |
| 2003/0181200 A1 | 9/2003 | Iida | |
| 2004/0070671 A1 | 4/2004 | Bengtsson | |
| 2004/0243671 A9* | 12/2004 | Needham et al. | 709/204 |
| 2005/0043057 A1 | 2/2005 | Lo | |
| 2005/0091357 A1* | 4/2005 | Krantz et al. | 709/223 |
| 2005/0264845 A1 | 12/2005 | Edwards et al. | 358/1.15 |
| 2007/0010244 A1* | 1/2007 | Tanaka et al. | 455/425 |
| 2007/0024931 A1 | 2/2007 | Compton et al. | |
| 2007/0117586 A1* | 5/2007 | Billmaier et al. | 455/552.1 |
| 2007/0198632 A1 | 8/2007 | Peart et al. | |
| 2007/0216782 A1 | 9/2007 | Chernoff | |
| 2008/0101266 A1 | 5/2008 | Dahlstedt et al. | |
| 2008/0209010 A1 | 8/2008 | Zitnick, III et al. | |
| 2008/0240702 A1 | 10/2008 | Wassingbo et al. | |
| 2008/0293415 A1* | 11/2008 | Fan | 455/435.2 |
| 2008/0299951 A1 | 12/2008 | Karkanias et al. | |
| 2009/0028169 A1 | 1/2009 | Bear et al. | |
| 2009/0037605 A1* | 2/2009 | Li | 709/246 |
| 2009/0144657 A1 | 6/2009 | Zhang et al. | |
| 2009/0146796 A1* | 6/2009 | Goto et al. | 340/10.51 |
| 2009/0185792 A1 | 7/2009 | Braunstein et al. | |
| 2009/0238093 A1 | 9/2009 | Saneto | |
| 2009/0238419 A1* | 9/2009 | Steinberg et al. | 382/118 |
| 2009/0284611 A1 | 11/2009 | Wood et al. | |
| 2010/0029326 A1 | 2/2010 | Bergstrom et al. | |
| 2010/0110997 A1 | 5/2010 | Erceg et al. | |
| 2010/0194896 A1 | 8/2010 | Heimendinger | |
| 2010/0277597 A1 | 11/2010 | Vaysburg et al. | |
| 2011/0016476 A1 | 1/2011 | Raju | |
| 2011/0069179 A1 | 3/2011 | Bathiche et al. | |
| 2011/0081952 A1 | 4/2011 | Song et al. | |
| 2011/0096168 A1 | 4/2011 | Siann et al. | |
| 2011/0116125 A1 | 5/2011 | Park | |
| 2011/0116479 A1* | 5/2011 | Jarzra et al. | 370/332 |
| 2012/0179749 A1 | 7/2012 | Takamura | |
| 2013/0079063 A1* | 3/2013 | Jouin | 455/566 |

OTHER PUBLICATIONS

"Eye-Fi Mobile X2," downloaded Oct. 31, 2011, http://www.eye.fi/files/2011/04/mobileX2_wow_2011.pdf.zip.

International Search Report and Written Opinion for PCT/US2012/062636, mailed Feb. 25, 2013.

International Preliminary Report on Patentability issued on PCT/US2012/062636, mailed May 22, 2014.

* cited by examiner

| NETWORK PATHWAY | HOME PC | WIRELESS ROUTER | HOTSPOT #1 | HOTSPOT #2 | SMART PHONE | TABLET |
|---|---|---|---|---|---|---|
| NAME | MY PC | HOME NET | RIT | STAR COFFEE | MY PHONE | MY TABLET |
| PATHWAY TYPE | WIRELESS PC | WIFI ROUTER | WIFI HOTSPOT | WIFI HOTSPOT | WIFI TO 4GSM | WIFI TO 3GSM |
| DATA RATE | 10Mbps | 1Mbps | 1Mbps | 2Mbps | 5Mbps | 5Mbps |
| DATA COST | 0 | 0 | 0 | $2 | 2GB/MONTH DATA PLAN | 200MB/MONTH DATA PLAN |
| PROCESSING CAPABILITIES | HIGH | NO | NO | NO | MEDIUM | MEDIUM |
| CAMERA POWER USAGE | LOWEST | HIGH | HIGH | MEDIUM | LOW | LOW |
| USER PREFERENCE | 1 | 2 | 3 | 6 | 4 | 5 |

*FIG. 5*

WIRELESS CAMERA WITH IMAGE SHARING PRIORITIZATION

CROSS-REFERENCE TO RELATED APPLICATIONS

Reference is made to commonly-assigned, co-pending U.S. patent application Ser. No. 13/294,221, entitled "Method for wireless sharing of images", by Bednarczyk et al, incorporated herein by reference.

FIELD OF THE INVENTION

This invention pertains to the field of digital cameras, and more particularly to a digital camera which transfers images over a wireless interface.

BACKGROUND OF THE INVENTION

Digital cameras capture, process, and store digital images. These digital images can be transferred to other devices for viewing, storage and printing. In many cases, digital images are captured and then "shared" over a network, such as the Internet, with family and friends.

Digital cameras can transfer user-selected images over wireless networks, as described in commonly-assigned U.S. Pat. No. 7,936,391 to Ward et al., entitled "Digital camera with communications interface for selectively transmitting images over a cellular phone network and a wireless LAN network to a destination," which is incorporated herein by reference. Ward et al. describe how a user of a digital camera can select one of a plurality of communications icons in order to transfer user-selected digital images from the digital camera to a selected destination over one of a plurality of communications networks. This patent also describes how the user-selected images can be identified using an "image utilization" file, which identifies the digital images to be transferred to the selected destination. In some embodiments, the image utilization file is an "Auto Transfer" file as defined in the well-known DPOF 1.1 standard.

It is known to provide a communication device for interconnecting a digital camera to a communications network, for example as described in U.S. Pat. No. 6,750,902 to Steinberg, et al., entitled "Camera network communication device." This patent describes communications devices that can use various wireless communications technologies, including cellular connections and unlicensed wireless frequencies, to transfer camera data to multiple destinations.

It is known to utilize a wireless digital camera and cellular phone to provide a multi-point wireless link, for example as described in U.S. Pat. No. 7,526,314 to Kennedy, entitled "Remote data storage and retrieval for portable electronics." This patent describes a Bluetooth-enabled camera that communicates to a cellular telephone, which in turn uses a 3G wireless link to remotely store digital images captured by the wireless digital camera on an Internet-connected remote storage device.

It is also known to provide wireless digital cameras that can transfer images to a "smart phone." For example, the Samsung SH100 digital camera sold by Samsung Electronics America includes a WiFi modem which can transfer images to other devices, including smart phones. By loading a custom software application (APP) on the smart phone, the smart phone can be used as a remote shutter release to control the capture of digital images by the digital camera.

It is also known to wirelessly transfer images from a digital camera to a smart phone in order to use the smart phone to share digital images over a cellular data communications network, such as a "3G" network. For example, the company Eye-Fi of Mountain View, Calif. sells a "Mobile X2" SDHC format memory card, which includes a Flash memory to store digital images captured by a digital camera. It also includes a WiFi modem to transfer the digital images over a WiFi network to a computer, a smart phone or a network connection to a sharing web site (such as FaceBook or YouTube).

While it is often desirable to wirelessly share digital images from digital cameras with various sharing destinations, it can be difficult to establish preferred connections from a digital camera to a preferred wireless network when several different wireless networks having different image-transfer related capabilities operate in the same location.

There remains a need to provide improved wireless digital cameras which can easily establish communications with a preferred wireless network, and enable user-selected images to be quickly and easily shared with multiple sharing destinations, no matter where the digital camera is located as images are captured.

SUMMARY OF THE INVENTION

The present invention represents a digital camera, comprising:

an image sensor for capturing a digital image;

an optical system for forming an image of a scene onto the image sensor;

a wireless communication system;

a data processing system;

a storage memory for storing captured images; and a program memory communicatively connected to the data processing system and storing instructions configured to cause the data processing system to implement a method for sharing digital images across a wireless network, wherein the method includes:

capturing a digital image of the scene using the image sensor;

providing user interface elements enabling a user to select a sharing destination for the digital image;

identifying a plurality of network pathways for communication with the sharing destination using the wireless communication system;

determining a priority for each of the network pathways; and transmitting the digital image to the sharing destination using the highest priority network pathway.

The present invention has the advantage that when multiple network pathways are available, the network pathway enabling the most efficient data transfer rate can be selected in order to provide an improved user experience, reduce power consumption by the digital camera and reduce any data transmission costs.

It has the additional advantage that the digital camera can automatically share digital images using different network pathways depending on the choices that are available in different environments.

It has the further advantage that the digital camera can efficiently share digital images with a plurality of different sharing destinations by first transmitting them to an intermediate node where they can be distributed to the plurality of sharing destinations.

BRIEF DESCRIPTION OF THE DRAWINGS

FIG. 5 is a table showing information useful for determining network pathway priorities;

Figure 1:
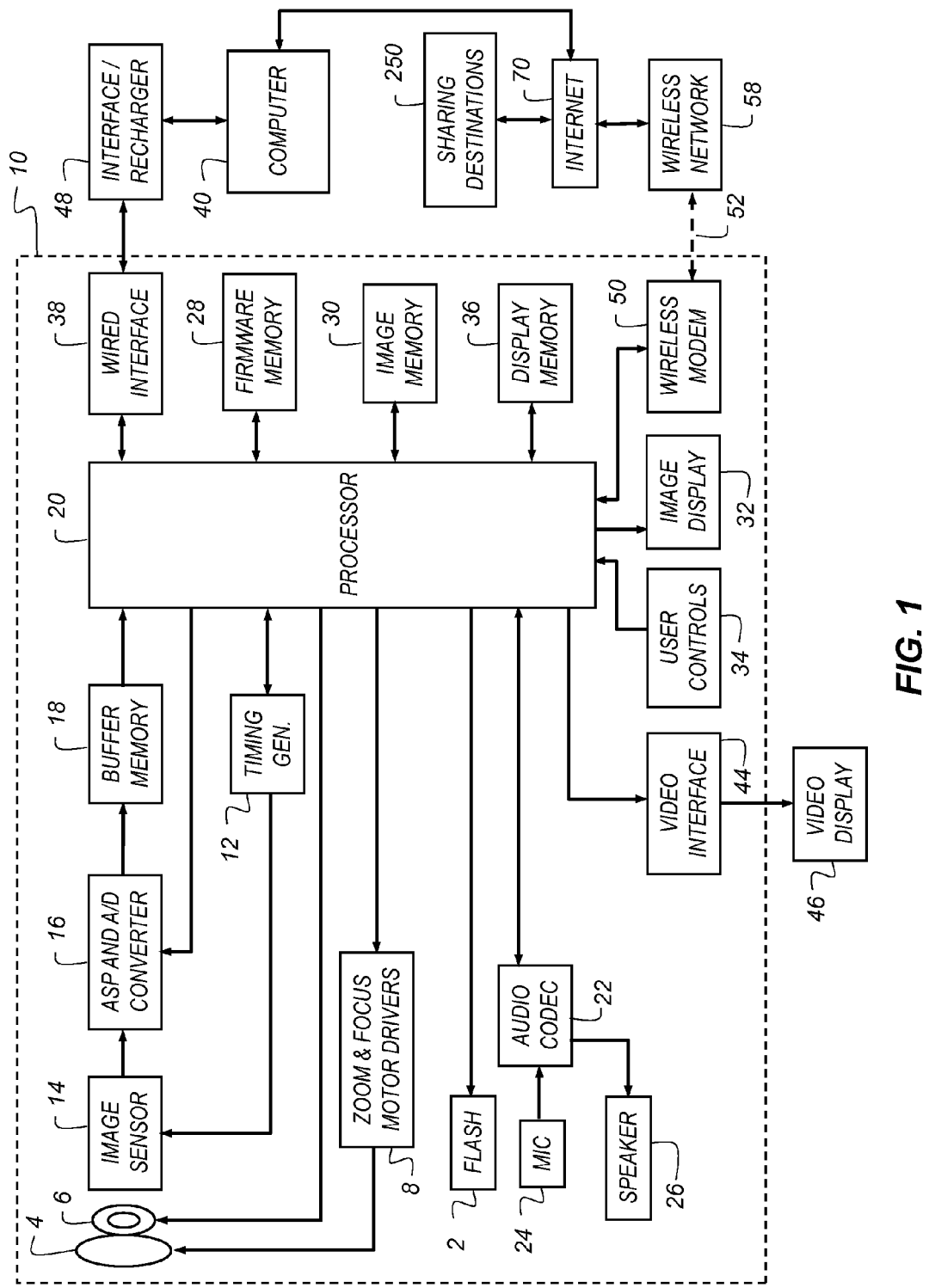
FIG. 1 is a high-level diagram showing the components of a digital camera system.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following descriptions of digital cameras and digital imaging systems will be familiar to one skilled in the art. It will be obvious that there are many variations of these embodiments that are possible and are selected to reduce the cost, add features or improve the performance of the digital cameras and digital imaging systems.

FIG. 1 depicts a block diagram of a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a sound or voice recorder, a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drivers 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is composed of user interface elements which are controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS information received from another device.

In some embodiments, the digital camera 10 can include a global position system (GPS) sensor that can be used to provide geographical location information. The geographical location information can be stored as metadata in association with captured digital images. As will be described later in reference to FIG. 7, in some configurations the GPS sensor can be located in another device, such as a smart phone, that is in communication with the digital camera 10. In this case, the geographical location information can be communicated from the external device to the digital camera 10 for storage as metadata in association with captured digital images. In other embodiments, geographical location information can be determined based upon the identity of nearby network connection points, such as the MAC address of a nearby Wi-Fi router.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The user controls 34 can be used to select captured images to be shared, and to select sharing destinations. The selected images and sharing destinations can be stored in an file, as described in commonly assigned U.S. Pat. No. 7,034,871 to Parulski et al., entitled "Capturing digital images to be transferred to an email address," which is incorporated herein by reference. Alternatively, the sharing destinations may be stored in a searchable database. In some embodiments, the sharing destinations can be provided from a separate device, such as computer 40, and transferred to the digital camera 10 using the wired interface 38 or the wireless modem 50. These sharing destinations include entries selected from a Facebook "friends list", for example.

In some embodiments, the selection of images to be shared can be automatically determined based on user direction. For example, a user can indicate that all pictures taken during this capture session are to be automatically shared, where a capture session may be defined as continuing up to the time the user turns off the camera. As an example of when this feature may be useful, a parent of school-age child may be capturing pictures of the child at some school event, and may wish to automatically share all such pictures with an absent parent or relative.

In some embodiments, the selected images and sharing destinations can be identified by maintaining a share database table that contains a row for each share action, where the action is characterized by a share identifier (ShareID), a picture identifier (PictureID) specifying the picture to be shared, and a share destination (DestinationDisplayName, DestinationSortName, DestinationHash). For email shares, the share action can also identify the individual to receive the shared asset (PeopleDisplayName, PeopleSortName, PeopleHash).

In some embodiments, the digital camera 10 includes an orientation sensor (not shown) for sensing an orientation of the digital camera 10. The orientation information can be used to correct the image orientation, as described in commonly-assigned U.S. Pat. No. 5,900,909 to Parulski et al., entitled "Electronic still camera having automatic orientation sensing and image correction," which is incorporated herein by reference. Orientation sensors are well-known in the art and generally use components such as accelerometers, gyroscopes and electronic compasses to sense an orientation.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

According to some embodiments, the processor 20 analyzes the input digital image using a person recognition algorithm to identify at least one particular person in the input digital image. Any type of person recognition algorithm known in the art can be used in accordance with the present invention. Examples of person recognition algorithms include facial recognition algorithms such as those taught in U.S. Pat. No. 6,940,545 to Ray et al., entitled "Face detecting camera and method," U.S. Pat. No. 4,975,969 to Tal, entitled "Method and apparatus for uniquely identifying individuals by particular physical characteristics and security system utilizing the same," and U.S. Pat. No. 7,599,527 to Shah et al., entitled "Digital image search system and method," all of which are incorporated herein by reference. Facial recognition algorithms typically work by determining various facial parameters corresponding to ratios of distances between identifiable points on the human face. The facial parameters determined for a face in a particular digital image can be compared to reference facial parameters determined for a set of predefined persons to determine whether there is a statistically significant match.

In some embodiments, a user may wish to specify to the digital camera that all digital images containing a certain individual should be automatically shared with a particular recipient. For example, the aforementioned parent may be photographing multiple children, and may wish to further specify that all pictures captured of a particular child are automatically shared to the child. Using in-camera face recognition, such embodiments may automatically determine the recipient. The list of sharing destinations may be expanded to include the information need to associate the face tag with each recipient.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The computer 40 can transfer digital images via the Internet 70 to sharing destinations 250. The wired interface 38 can conform to, for example, the well-known USB 2.0 interface specification. Alternatively, the wired interface 38 can conform to other interface specifications, such as the IEEE 1394 "Firewire" interface specification. The interface/recharger 48 can provide power via the wired interface 38 to a set of rechargeable batteries (not shown) in the digital camera 10.

The digital camera 10 includes a wireless modem 50, which interfaces over a wireless communication link 52 with the wireless network 58. The wireless modem 50 can use various wireless interface protocols, such as the well-known 802.11 wireless interface or the well-known Bluetooth wireless interface. Emerging interfaces such as Near Field Communication Interface and Protocol (ISO/IEC 18092 and ISO/IEC 21481) may also be used. The wireless network 58 can connect to the internet 70 using various wireless network pathways.

Figure 2:
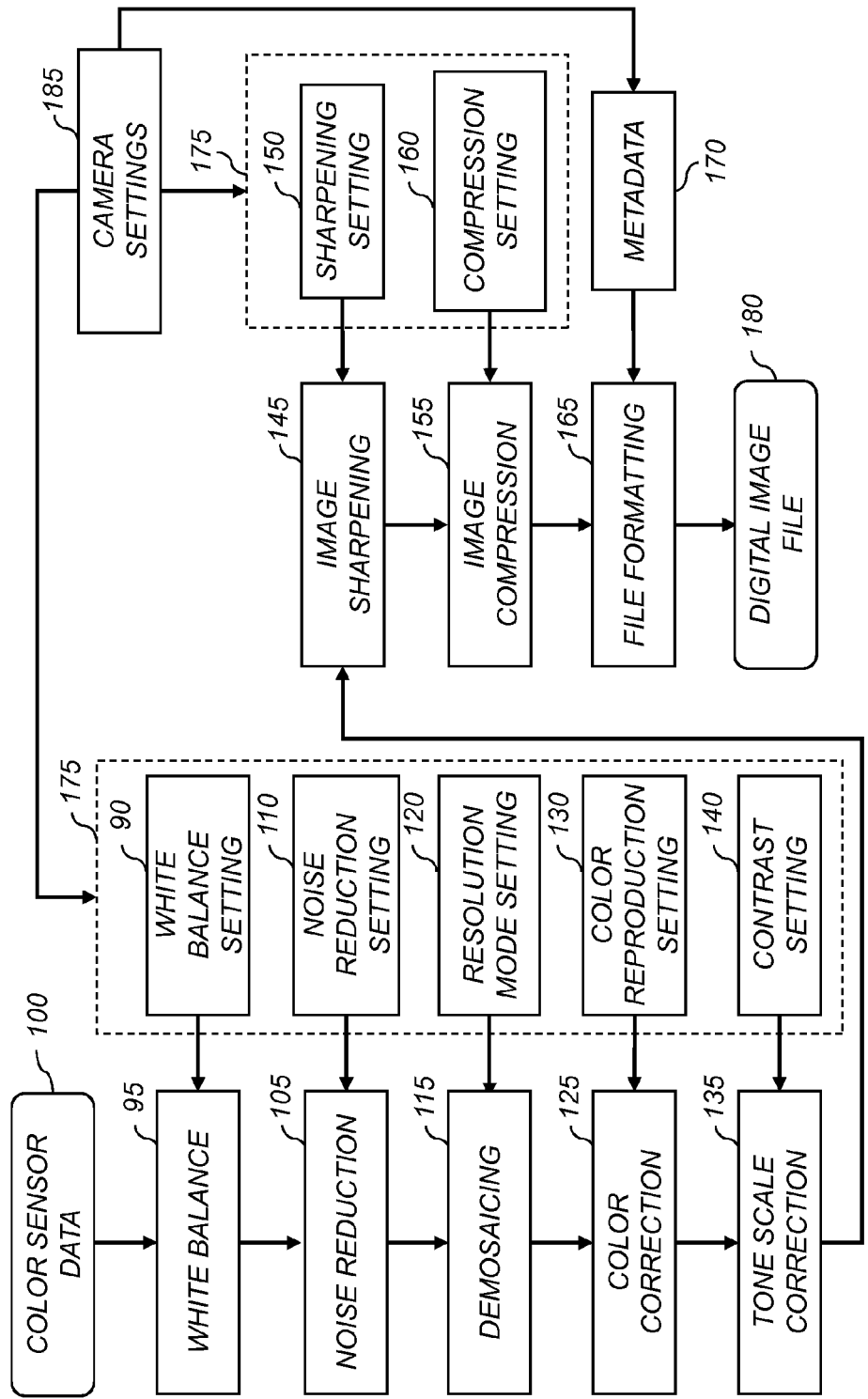
FIG. 2 is a flow diagram depicting image processing operations used to process digital images captured by the digital camera of FIG. 1.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to a noise reduction setting 110. The noise reduction setting 110 is generally tied to the camera ISO exposure index setting, so that more filtering is performed at higher ISO exposure index settings. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color reproduction setting 130 is used to select one of the following color correction matrices:

Setting 1 (Normal Color Reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (Saturated Color Reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (De-Saturated Color Reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (Monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including any photography mode settings 175 that were selected by the user. The metadata can also include an indication of the identities of any persons that were identified to be in the captured digital image stored in the stored in the digital image file 180.

As was discussed earlier with reference to FIG. 1, in some embodiments the digital camera 10 can receive GPS information from another device, such as a smart phone. In such embodiments, the processor 20 in the digital camera 10 can use the wireless modem 50 to initiate communication with the other device after capturing one or more images in order to request GPS information from the other device. The other device then provides the GPS information, which is stored as metadata in the digital image file 180.

Figure 3:
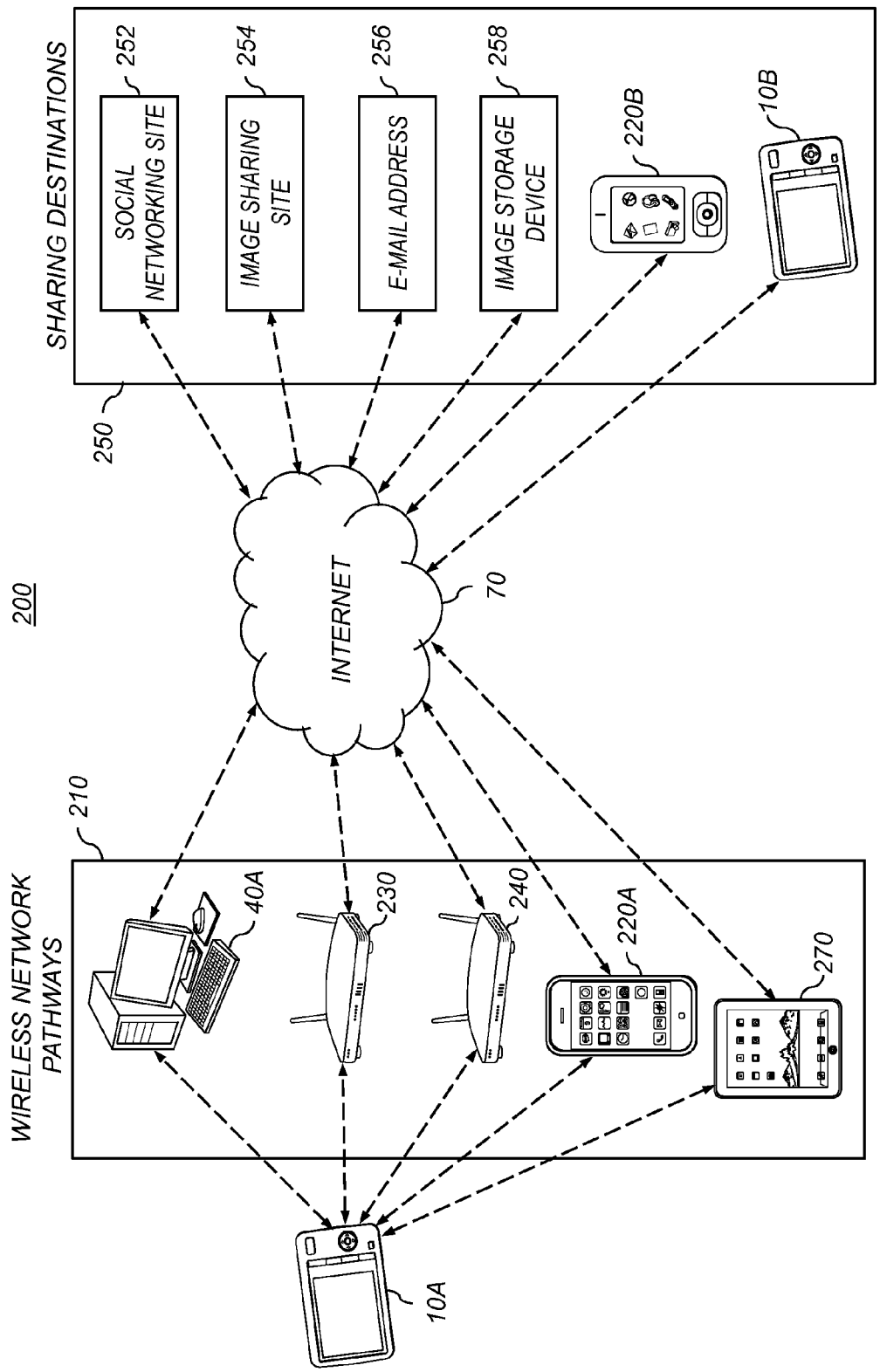
FIG. 3 is a high-level diagram illustrating a digital imaging system using wireless communication pathways.

FIG. 3 is a high-level diagram illustrating a digital imaging system 200. The digital imaging system 200 includes a digital camera 10A. The digital imaging system 200 also includes a plurality of wireless network pathways 210 which can be used to transfer digital images captured by the digital camera 10A to a plurality of sharing destinations 250 over a communications network, such as the Internet 70. The plurality of wireless network pathways 210 includes a network pathway which uses a wireless-accessible computer 40A, a network pathway which uses a wireless router 230, a network pathway which uses a wireless hotspot 240, a network pathway which uses a wireless link to a smart phone 220A, and a network pathway which uses a wireless link to a tablet computer 270. A network pathway which uses near field communication (not shown) can also be used in accordance with the present invention.

In some embodiments, the digital camera 10A functions as a server, advertising its presence and state to the other components, such as the wireless-accessible computer 40A and the smart phone 220A. Application software running on the wireless-accessible computer 40A and the smart phone 220A also advertises the presence of these devices, so that they can be discovered on the wireless network.

The wireless-accessible computer 40A can be, for example, a home computer having a WiFi interface or an Ethernet interface connected to a wireless network, such as an iMac computer sold by Apple Inc., Cupertino, Calif. The wireless-accessible computer 40A can include a display screen which can display images, a hard drive which can store images, and a cable modem interface to the Internet 70.

The wireless router 230 can be, for example, a Linksys E3200 High Performance Dual-Band N Router sold by Cisco Corp. of Irvine Calif., which uses the 802.11n "WiFi" standard. The wireless router 230 can provide security using standard security protocols, such as WPA and WPA2, in order to prevent unauthorized devices from using the wireless router 230 to access the Internet 70.

The wireless hotspot 240 can be, for example, a Cisco WAP4410N Wireless-N Access Point sold by Cisco Corp. of Irvine, Calif. The wireless hotspot 240 can be located in a public location such as a school building, an airport terminal, or a coffee shop. The wireless hotspot 240 can provide security using standard security protocols, such as WPA and WPA2, in order to prevent unauthorized devices from using the wireless hotspot 240 to access the Internet 70.

The smart phone 220A can be, for example, an Apple iPhone 4 sold by Apple Inc. of Cupertino, Calif. which uses the iOS operating systems, a Samsung Focus smart phone sold by Samsung Consumer Electronics of Ridgefield Park, N.Y., which uses the Windows Phone 7 operating system, or a Samsung Galaxy S Smart Phone, which uses the Android operating system.

The tablet computer 270 can be, for example, an Apple iPad 2 sold by Apple Inc. of Cupertino, Calif. which uses the iOS operating systems, an HP Slate 500 Tablet PC sold by Hewlett Packard of Palo Alto, Calif., which uses the Windows 7 operating system, or a Samsung Galaxy Tab tablet computer, which uses the Android operating system.

The plurality of sharing destinations 250 can include social networking sites 252, image sharing sites 254, E-mail addresses 256, image storage devices 258, and other image capture devices such as smart phones 220B and digital cameras 10B.

The social networking sites 252 that serve as sharing destinations 250 can include, for example, the Facebook social networking sites. When digital images are shared with a social networking site 252, they are generally shared with a user account associated with a specified user. The user account may be associated with the user of the digital camera 10A, or with some other user. The social networking sites can also include other sites such as MySpace (not shown). It will be understood that these social networking sites can be accessed by various individuals to view the shared digital images using, for example, desktop computers, tablet computers, and smart phones.

The image sharing sites 254 can also include online image sharing websites such as the Kodak Gallery image sharing website, or the Yahoo Flickr image sharing website. When digital images are shared with image sharing sites 254, they are generally shared with a user account associated with a specified user.

The E-mail addresses 256 that serve as sharing destinations 250 can include, for example, E-mail addresses that are provided by Gmail, which is an E-mail service provided by Google, Inc. of Mountain View, Calif. The E-mail addresses 256 can also include E-mail services provided by many other service providers, such as yahoo E-mail and AOL E-mail. It will be understood that digital images sent to E-mail addresses 256 can be accessed by the owners of the E-mail accounts using various means such as desktop computers, tablet computers and smart phones. In some embodiments, an E-mail address 256 can be associated with a digital image display device, such as a KODAK PULSE Digital Frame (W1030S), so that the shared digital images are automatically displayed when they are received by the digital image display device.

The image storage devices 258 that serve as sharing destinations 250 can include a hard disk located in a user's home or office computer. The image storage devices 258 can also include network drives such as the Seagate GoFlex 2 TB Home Network Storage System sold by Seagate Technology of Scotts Valley, Calif., or can be an online storage device such as a cloud server.

The smart phone 220B and the digital camera 10B can be devices that are associated with the user of the digital camera 10A. Alternately, they can be devices associated with other users. For example, the user of the digital camera 10A can choose to share digital images by sending them to a friend's or relative's smart phone 220B or digital camera 10B.

Figure 4:
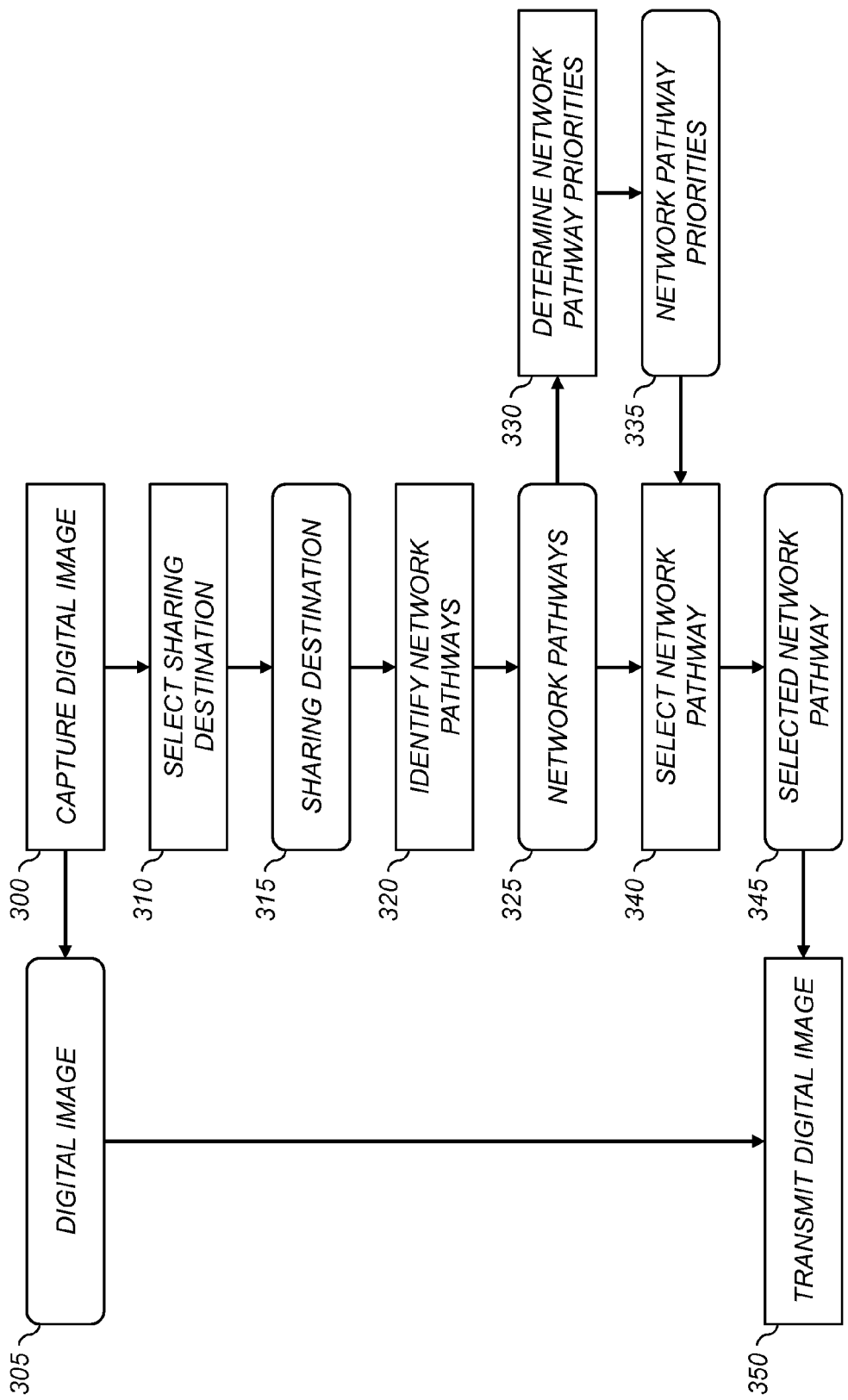
FIG. 4 is a flowchart of a method for providing image sharing prioritization in accordance with the present invention.

FIG. 4 is a flowchart of a method for sharing digital images according to a prioritization of available wireless network pathways 210 (FIG. 3). In capture digital image step 300, a digital image 305 is captured with digital camera 10 (FIG. 10) and processed as was described earlier in relation to FIG. 1 and FIG. 2. During the capture digital image step 300, an optical system, such as lens 4 (FIG. 1), forms an image of a scene (not shown) onto the image sensor 14 (FIG. 1). The image sensor 14 is used for capturing images, which are processed by a data processing system, such as processor 20 (FIG. 1) in the digital camera 10, and stored in a storage memory, such as image memory 30 (FIG. 1). The processor 20 is coupled to a program memory, such as firmware memory 28 (FIG. 1), which stores instructions that control the processing applied to the digital image 305. A wireless communication system, such as wireless modem 50 (FIG. 1), is used to share the digital image 305 using wireless network 58 (FIG. 1).

In select sharing destination step 310, the processor 20 in the digital camera 10 provides user interface elements including user controls 34 (FIG. 1) enabling a user to select a sharing destination 315 for the captured digital image 305. In a preferred embodiment, the sharing destination 315 is selected from a plurality of predefined possible sharing destinations. In some embodiments, a list of the possible sharing destinations is provided on image display 32 (FIG. 1) of the digital camera 10, and the user controls 34 enable the user of the digital camera 10 to select a particular sharing destination from the list. The selection can be accomplished using various types of user controls 34, as was described earlier in relation to FIG. 1. In some embodiments, the list is provided using text strings, such as "My Facebook page," "My Kodak Gallery account," "My network drive," "Jean's E-mail," "Dad's phone," or "Tom's camera." In other embodiments, the list can be provided using icons or images which represent various devices or persons.

In identify network pathways step 320, the processor 20 in the digital camera 10 identifies a plurality of available network pathways 325 for communication with the sharing destination 315 using the wireless network 58 (FIG. 1). (These network pathways 325 can include some or all of the example wireless network pathways 210 shown in FIG. 3.) It will be understood that various well-known communications protocols can be used by the digital camera 10. For example, the digital camera 10 can use the IPv4 protocol for communication with system components and can use the DNS-SD and mDNS protocols to carry out service discovery.

For example, if the digital camera 10 is being used in the user's home, the available network pathways 325 can include a network pathway 325 that uses a wireless-accessible computer 40A (FIG. 3), a network pathway 325 that uses a wireless router 230 (FIG. 3), and a network pathway 325 that uses a wireless link to the user's smart phone 220A (FIG. 3), assuming that all of these devices are turned on, and are located at positions which are near enough to the digital camera 10 to allow sufficient signal strength for wireless communications.

In another example, if the digital camera 10 is being used outside the user's home, for example at a college campus, the available network pathways 325 can include a network pathway 325 that uses a wireless hotspot 240 (FIG. 3) and a network pathway 325 that uses the user's smart phone 220A (FIG. 3). If the digital camera 10 is being used in a remote area, such as a park or beach, the available network pathways 325 might include only the network pathway 325 that uses the user's smart phone 220A.

In some cases, it is possible that no available network pathways 325 can be identified. For example, the digital camera 10 may be being used in a wilderness location where the user's smart phone 220A is too far away from a cellular telephone tower to enable the smart phone 220A to establish communications with the Internet 70, or if the smart phone 220A is not powered on. In this scenario, the digital image 305 will be shared at a later time when a network pathway 325 becomes available, where the later time can be determined by monitoring the availability of network pathways 325 or can be a pre-determined check time, or any combination thereof.

In a determine network pathway priorities step 330, the processor 20 in the digital camera 10 determines a network pathway priority 335 for each of the network pathways 325. In various embodiments, the network pathway priorities 335 can be determined responsive to various factors associated with the network pathways 325. For example, network pathway priorities 335 can be determined responsive to factors such as estimated data transfer rates for the identified network pathways 325, estimated transmission times for transmitting the digital image 305 over the different identified network pathways 325, estimated power consumption that will be used by the digital camera 10 to transmit the digital image 305 over the identified network pathways 325, or estimated costs to transmit the digital image 305 over the identified network pathways 325, or combinations thereof.

It will be understood that the available network pathways 325 identified in the identify network pathways step 320 can provide different data transfer rates, and will therefore provide different total transmission times. In some embodiments, the determine network pathway priorities step 330 determines the network pathway priorities 335 responsive to the respective data transfer rates (or estimated transmission times). Network pathways 325 having higher data transfer rates (or faster total transmission times) can be assigned a higher network pathway priority 335 than network pathways 325 having lower data transfer rates (or slower total transmission times). Assigning the network pathway priorities 335 in this manner enables the network pathway 325 to be selected that will minimize the time required to transmit the digital image 305 to the sharing destination.

In some cases, one or more of the network pathways 325 may involve multiple transmission steps (e.g., from the digital camera 10 to the smart phone 220A to the Internet 70 to the selected sharing destination 315). Each of these transfer steps will have an associated data transfer rate. In some embodiments, the digital camera 10 may be incapable of performing other functions such as capture while data is being transferred. The data transfer rate associated with transferring the digital image 305 off of the digital camera 10 can be used to determine the associated network pathway priority 335 since this is the data transfer rate that will determine how quickly the user will be able to use the digital camera 10 to perform other functions, such as capturing additional digital images. For example, wirelessly transferring data to a wireless-accessible computer 40A is, in most cases, faster than transferring data directly to the Internet 70 through a wireless router 230 via an Internet Service Provider. In other embodiments, the data transfer rate associated with the rate limiting step can be used to determine the associated network pathway priority 335, which will provide an indication of the overall data transfer rate. For example, when transferring data from the digital camera 10A to a smart phone 220A will typically be faster than transferring the data from the smart phone 220A to the Internet via 4G.

Consider the case where the network pathway priorities 335 are determined from the data transfer rates (or the estimated total transfer times). The data transfer rates can be pre-determined fixed values associated with the network pathways or can be calculated during wireless transmission by the digital camera 10A over the network pathways, or alternatively can be received by the digital camera 10A from the wireless enabled computer 40A or Smartphone 220A as part of wireless communication sharing data. The network pathway priorities 335 can be determined using a variety of different methods. For example, in some embodiments, the network pathway priorities 335 can be numerical values representing the data transfer rate (or the estimated transmission time) for each network pathway 325. In other embodiments, the network pathway priorities 335 can be ordinal values determined by sorting the available network pathways 325 according to their data transfer rates and assigning a "1" to the network pathway 325 with the highest data transfer rate, a "2" to the network pathway 325 with the second highest data transfer rate, and so forth.

For example, consider an example where the digital camera 10 is operating in a home WiFi environment that includes a wireless-accessible computer 40A and a wireless router 230. The set of network pathways 325 available to share the digital image 305 with a social networking site 252 sharing destination include a first network pathway 325 that involves transferring the digital image 305 from the digital camera 10 to the wireless-accessible computer 40A, and from there to the social networking site 252 via the internet, and a second network pathway 325 that involves transferring the digital image 305 from the digital camera 10 through the wireless router 230 to the social networking site 252 via the internet. The determine network pathway priorities step 330 can prioritize these network pathways 325 in order to select the one that will maximize the data transfer rate for transferring the digital image 305 off the digital camera (or equivalently will minimize the time required to transfer the digital image 305 off the digital camera 10). In this case, the first network pathway 325 would generally be assigned the higher priority since the expected WiFi data transfer rate between the digital camera 10 and the wireless-accessible computer 40A will generally be an order of magnitude faster than the data transfer rate associated with directly uploading the digital image 305 to the Internet through the wireless router 230 given the upload speeds typically experienced in the typical consumer home environment.

It will be understood that reducing the data transmission time reduces the power drain on the camera's battery, and improves the overall user experience. Using an intermediate node on the network pathway, such as the wireless-accessible computer 40A or the smart phone 220A, can further improve camera battery usage in the case where the captured digital image 305 is intended for multiple sharing destinations 250. If the digital camera 10 is responsible for sending the captured digital image 305 directly to multiple sharing destinations 250 using the wireless router 230 or the wireless hotspot 240, then sharing the captured digital image 305 with multiple sharing destinations 250 requires the digital camera 10 to transmit the captured digital image 305 multiple times, once for each sharing destination 315. By using the wireless-accessible computer 40A or the smart phone 220A as an intermediate node on the network pathway, the digital camera 10 need only transmit the captured digital image 305 once, along with the list of intended destinations. The intermediate node can then transmit the captured digital image 305 to the plurality of sharing destinations 315. In addition, the digital image 305 can be stored on the intermediate node, in order to allow it to be viewed on the wireless-accessible computer 40A or the smart phone 220A at a later time, or to be printed or archived.

It will be understood that the smart phone 220A uses an application, which will be described later in reference to FIG. 8, in order to transfer the digital image 305 to any sharing destination to which the smart phone 220A can establish a cellular data connection.

In some embodiments, the network pathway priorities 335 are determined responsive to a plurality of factors and user-specified constraints and preferences. For example, the user-specified preferences can include a user-specified preference order specifying a priority order for the plurality of network pathways 325. FIG. 5 shows a network pathway table 400 listing information that can be used by the determine network pathway priorities step 330 (FIG. 4) in some embodiments of the present invention. The columns of the network pathway table 400 provide information for a plurality of network pathways 325 (FIG. 4), including a home PC network pathway 410 through a wireless-accessible computer 40A (FIG. 3) named "MY PC," a wireless router network pathway 412 through a wireless router 230 (FIG. 3) named "HOME NET," a hotspot #1 network pathway 414A through a first wireless hotspot 240 (FIG. 3) named "RIT," a hotspot #2 network pathway 414B through a second wireless hotspot 240 named "STAR COFFEE," a smart phone network pathway 416 through a smart phone 220A (FIG. 3) named "MY PHONE," and a tablet network pathway 418 through a tablet computer 270 (FIG. 3) named "MY TABLET."

The network pathway table 400 shown in FIG. 5 includes rows which give the pathway type, data rate, data cost, processing (or storage) capabilities, camera power usage, and user preference for each of the network pathways.

In some embodiments, the data rate row of the network pathway table 400 in FIG. 5 is used to determine the network pathway priorities 335 for the plurality of network pathways 325 in determine network pathway priorities step 330 of FIG. 4. For example, whenever the home PC is one of the network pathways identified in identify network pathways step 320, then it will be determined to have the highest network pathway priority 335, since it has the highest data rate (e.g., 10 Mbits/sec) of all of the network pathways listed in FIG. 5. As another example, if the identify network pathways step 320 identifies the hotspot #1 network pathway 414A and the smart phone network pathway 416 as the two possible network pathways 325, then the smart phone network pathway 416 will be determined to be the highest priority because it provides a data rate of 5 Mbits/sec, which is greater than the 1 Mbit/sec data rate provided by the hotspot #1 network pathway 414A. In both of these examples, determine network pathway priorities step 330 determines the network pathway priorities 335 responsive to the estimated data transfer rates of the identified network pathways 325. (It will be understood that the total transmission times of the identified network pathways is a mathematical function of the data rate, the size of the digital images to be transferred using the network pathways 325, and the signal environment. Therefore, in some embodiments, the determine network pathway priorities step 330 can use the transmission time, rather than the data transfer rate, to determine the network pathway priorities 335.)

In some embodiments, the data cost row of the network pathway table 400 in FIG. 5 is used to determine the network pathway priorities 335 for the plurality of network pathways 325 in determine network pathway priorities step 330 of FIG. 4. In some cases, the data cost may be specified in terms of a fixed cost for accessing the network pathway 325. In other cases, the data cost may be specified in terms of a cost/MB, or may be specified in terms of a constraint on the number of MB/month that can be transferred without incurring extra costs. For example, if the identify network pathways step 320 identifies the hotspot #1 network pathway 414A and the smart phone network pathway 416 as the two possible network pathways 325, then the hotspot #1 network pathway 414A will be determined to be the highest priority because it corresponds to a lower data transmission cost (i.e., "0" indicating that there is no cost) compared to the data cost associated with the 2 GByte/month data plan associated with the smart phone network pathway 416. In this example, determine network pathway priorities step 330 determines the network pathway priorities 335 responsive to the estimated data transmission costs associated with the identified network pathways 325.

In some embodiments, the processing capabilities row of the network pathway table 400 in FIG. 5 is used to determine the network pathway priorities 335 for the plurality of network pathways 325 in determine network pathway priorities step 330 of FIG. 4. For example, whenever the home PC network pathway 410 is one of the network pathways 325 identified in the identify network pathways step 320, then it will be determined to have the highest priority since it has the highest processing capability of all of the network pathways 325 listed in FIG. 5. As another example, if the identify network pathways step 320 identifies the hotspot #1 network pathway 414A and the smart phone network pathway 416 as the two possible network pathways 325, then the smart phone network pathway 416 will be determined to be the highest priority because it provides a "MEDIUM" processing capability, which is greater than the "NO" processing capability provided by the hotspot #1 network pathway 414A. In both of these examples, determine network pathway priorities step 330 determines the network pathway priorities 335 responsive to the processing capabilities associated with intermediate nodes on the identified network pathways 325. In some embodiments, a storage capability associated with the network pathways 325 can be used instead of, or in addition to the processing capabilities.

In some embodiments, the power usage row of the network pathway table 400 in FIG. 5 is used to determine the network pathway priorities 335 for the plurality of network pathways 325 in determine network pathway priorities step 330 of FIG. 4. In this example, the power usage is specified using a power usage category (e.g., "LOWEST," "LOW," "MEDIUM" or "HIGH"). In other cases, the power usage may be specified using a quantitative value, in terms of units such as power consumption/MB. Whenever the home PC network pathway 410 is one of the network pathways 325 identified in identify network pathways step 320, then it will be determined to have the highest priority since it has the lowest power usage of all of the network pathways 325 listed in FIG. 5. As another example, if the identify network pathways step 320 identifies the hotspot #1 network pathway 414A and the smart phone network pathway 416 as the two possible network pathways 325, then the smart phone network pathway 416 will be determined to be the highest priority because it provides a "LOW" camera power usage, which is less than the "HIGH" camera power usage provided by the hotspot #1 network pathway 414A. In both of these examples, determine network pathway priorities step 330 determines the network pathway priorities 335 responsive to the estimated power usage associated with the identified network pathways 325.

In some embodiments, the user preference row of the network pathway table 400 in FIG. 5 is used to determine the network pathway priorities 335 for the plurality of network pathways 325 in determine network pathway priorities step 330 of FIG. 4. The user preference row stores a user-assigned priority value for each of the network pathways 325. For example, whenever the home PC network pathway 410 is one of the network pathways 325 identified in identify network pathways step 320, then it will be determined to have the highest priority, since it has a user preference value of 1, which indicates that it has the highest priority of all of the network pathways 325 listed in FIG. 5. As another example, if the identify network pathways step 320 identifies the hotspot #1 network pathway 414A and the smart phone network pathway 416 as the two possible network pathways 325, then the hotspot #1 network pathway 414A will be determined to be the highest priority because it corresponds to a more preferred user preference value (i.e., "3") compared to the user preference value for the smart phone network pathway 416 (i.e., "4"). In both of these examples, determine network pathway priorities step 330 determines the network pathway priorities 335 responsive to user specified preferences associated with the identified network pathways 325.

In some embodiments, the network pathway priorities 335 may be determined by combining data from a plurality of rows in the network pathway table 400. In some cases, the values from the different rows can be combined, for example by performing a weighted average. In other cases, the values from one row can be used as the primary factor to determine the network pathway priorities 335, and additional rows can be used for tie breaking purposes. For example, the data cost can be used as the primary factor and the data rate can be used as a secondary factor to break ties when multiple network pathways 325 have the same data cost. In some embodiments, user controls can be provided to enable the user to specify which factors should be used as the primary and secondary factors.

Returning to a discussion of FIG. 4, a select network pathway step 340 is used to identify a selected network pathway 345 responsive to the network pathway priorities 335 associated with the network pathways 325. Generally, the select network pathway step 340 will select the network pathway 325 having the most favorable network pathway priority 335. In some embodiments, the select network pathway step 340 may impose one or more constraints that would cause it to select a network pathway 325 that does not have the most favorable network pathway priority 335. For example, in some embodiments, the network pathway priorities 335 are determined based on the data rate associated with the network pathways 325. The select network pathway step 340 would then select the network pathway 325 that delivers the highest associated data rate. However, the select network pathway step 340 can impose a constraint that a network pathway 325 should only be selected if the monthly data usage limits for the associated data plan have not been exceeded.

In some embodiments, the user may control the timing of sharing with certain sharing destinations based upon the available network path priority, or some other metric. For example, a user may wish to share one or more images immediately with a spouse or other significant person regardless of the cost or available route. However, the user may be willing to defer sharing with other sharing destinations until more favorable network pathway may be found.

In transmit digital image step 350, the processor 20 in the digital camera 10 transmits the digital image 305 to the sharing destination using the selected network pathway 345 which was determined in the select network pathway step 340. In a preferred embodiment, the digital image 305 is transmitted by transmitting the digital image file 180 (FIG. 2), which includes metadata relating to the captured digital image 305, such as GPS metadata provided by a smart phone as described earlier in relation to FIG. 1.

In some embodiments, a plurality of sharing destinations 315 can be selected by the user of the digital camera 10 during the select sharing destination step 310. In this case, the determine network pathway priorities step 330 can determine the network pathway priorities 335 taking into account the fact that some network pathways 325 may support the transmission of the digital image 305 to an intermediate node on the network pathway, such as wireless-accessible computer 40A, from which it can then be transmitted to the plurality of sharing destinations. Selecting one of these network pathways 325 enables the digital image 305 to be transmitted once to the intermediate node, and the intermediate node will then transmit the digital image 305 to the plurality of sharing destinations 250. In some embodiments, the digital image 305 is also archived on the intermediate node for archival purposes or future viewing by the user.

As was described earlier in reference to the identify network pathways step 320, it is possible that no available network pathways 325 are identified at the time the sharing destination 315 is selected. In some embodiments, the transmission of the digital image 305 is delayed until at least one network pathway 325 is identified at a later time, and the captured digital image 305 is then transmitted to the sharing destination 315 at this later time. In other embodiments, an error message is displayed and the transmission of the digital image 305 is cancelled.

Figure 6:
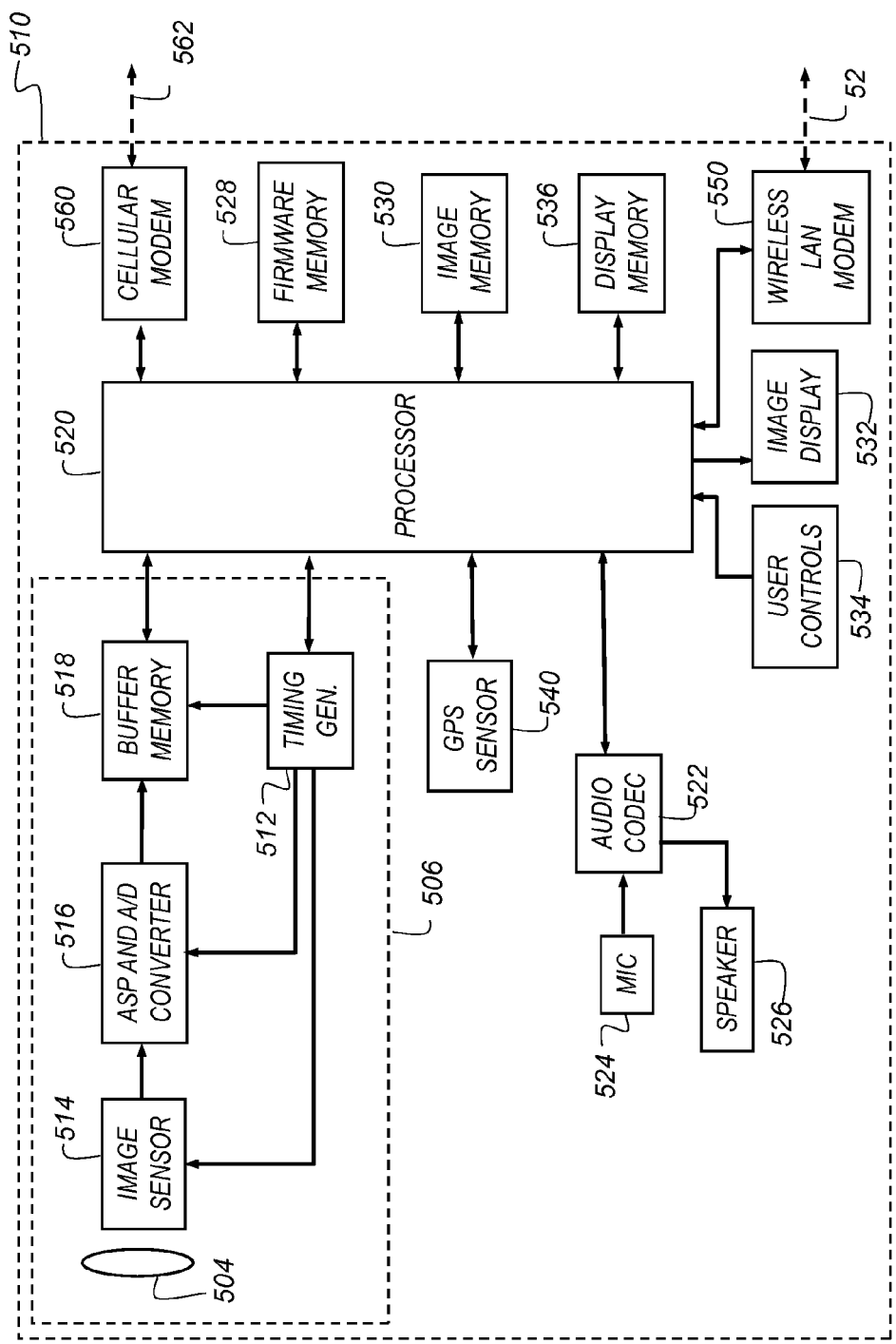
FIG. 6 is a high-level diagram showing the components of a programmable communications device.

FIG. 6 is a high-level diagram showing the components of a programmable communications device 510. The programmable communications device 510 can be, for example, a smart phone device or tablet device, such as the smart phone 220A or the tablet computer 270 described earlier in reference to FIG. 3. Preferably, the programmable communications device 510 is a portable battery operated device, small enough to be easily handheld by a user.

In some embodiments, the programmable communications device 510 includes a digital camera module 506 which captures both motion video images and still images. The programmable communications device 510 can also include other functions, including, but not limited to, the functions of a digital music player (e.g. an MP3 player), a mobile telephone, a GPS receiver, or a programmable digital assistant (PDA).

The digital camera module 506 includes a lens 504 which focuses an image of a scene (not shown) onto an image sensor 514. The output of the image sensor 514 is converted to digital form by Analog Signal Processor (ASP) and Analog-to-Digital (A/D) converter 516, and temporarily stored in buffer memory 518. The image data stored in buffer memory 518 is subsequently manipulated by a processor 520, using embedded software programs (e.g., firmware stored in firmware memory 528). Processed images are stored in image memory 530.

The processor 520 in the programmable communications device 510 can perform many other functions, in response to instructions stored in firmware memory 528. It will be understood that the functions of processor 520 can be provided using a single programmable processor or by using multiple programmable processors, including one or more digital signal processor (DSP) devices. Alternatively, the processor 520 can be provided by custom circuitry (e.g., by one or more custom integrated circuits (ICs) designed specifically for use in digital cameras), or by a combination of programmable processor(s) and custom circuits. It will be understood that connectors between the processor 520 from some or all of the various components shown in FIG. 6 can be made using a common data bus. For example, in some embodiments the connection between the processor 520, the buffer memory 518, the image memory 530, and the firmware memory 528 can be made using a common data bus.

The processor 520 produces menus and low resolution color images that are temporarily stored in display memory 536 and are displayed on the image display 532. The graphical user interface displayed on the image display 532 is composed of user interface elements which are controlled in response to user input provided by user controls 534. The user controls 534 are used to select various functions and programs, such as APPS, which can be stored in the firmware memory 528.

The user controls 534 are also used to turn on the programmable communications device 510 and select various modes and settings. User controls 534 typically include some combination of buttons, rocker switches, joysticks, or rotary dials. In some embodiments, some of the user controls 534 are provided by using a touch screen overlay on the image display 532. In other embodiments, the user controls 534 can include a means to receive input from the user or an external device via a tethered, wireless, voice activated, visual or other interface. In other embodiments, additional status displays or images displays can be used.

An audio codec 522 connected to the processor 520 receives an audio signal from a microphone 524 and provides an audio signal to a speaker 526. These components can be used for telephone conversations, as well as to record and playback an audio track, along with a video sequence or still image.

In some embodiments, the speaker 526 can be used as part of the user interface, for example to provide various audible signals which indicate that a user control has been depressed, or that a particular mode has been selected. In some embodiments, the microphone 524, the audio codec 522, and the processor 520 can be used to provide voice recognition, so that the user can provide a user input to the processor 520 by using voice commands, rather than user controls 534. The speaker 526 can also be used to inform the user of an incoming phone call. In addition, a vibration device (not shown) can be used to provide a silent (e.g., non audible) notification of an incoming phone call.

In some embodiments, a global position system (GPS) sensor 540 in the programmable communications device 510 can be used to provide geographical location information. In some embodiments, this geographical location information can be communicated from the programmable communications device 510 to the digital camera 10, and stored as metadata in association with captured digital images, as was described earlier in relation to FIG. 1. GPS sensors 540 are well-known in the art and operate by sensing signals emitted from GPS satellites. GPS sensors 540 receive highly accurate time signals transmitted from GPS satellites. The precise geographical location of the GPS sensor 540 can be determined by analyzing time differences between the signals received from a plurality of GPS satellites positioned at known locations.

It will be understood that the programmable communications device 510 can be connected to a battery charger (not shown) which can be used to provide power to a set of rechargeable batteries (not shown) in the programmable communications device 510.

The programmable communications device 510 includes a wireless local area network (LAN) modem 550, such as a WiFi modem, which communicates to other wireless devices, such as digital camera 10 (FIG. 1), over wireless communication link 52. The wireless LAN modem 550 can use various wireless interface protocols, such as the well-known 802.11 wireless interface or the well-known Bluetooth wireless interface. The programmable communications device 510 also includes a wide-area wireless communication system, such as a cellular modem 560 for communicating over a cellular communication link 562. The cellular modem 560 can use various well-known cellular communications protocols, such as the 3G or 4G protocols.

It will be understood that the processor 520 in the programmable communications device 510 serves as a data processing system which can be controlled by an executable software application, such as an APP, stored in firmware memory 528. The executable software application can include instructions for causing the data processing system to implement the method for processing captured digital images described earlier with reference to FIG. 2. The executable software application can also include instructions for causing the data processing system to implement the method described in reference to FIG. 7.

Figure 7:
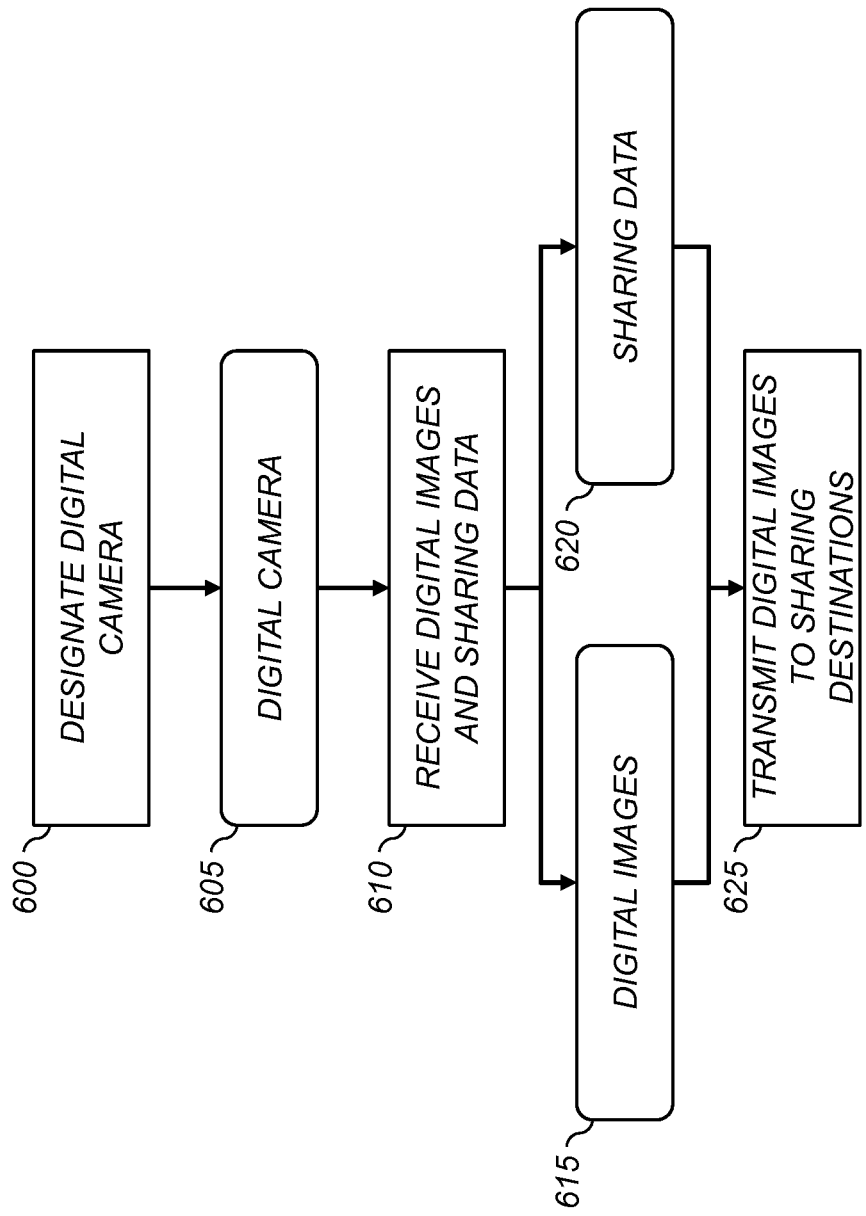
FIG. 7 is a flowchart of a method for using a programmable communication device to transmit digital images from a digital camera to designated sharing destinations.

FIG. 7 is a flowchart of a method for controlling a programmable communications device 510 (FIG. 6) to transmit digital images to sharing destinations 250 in accordance with the method described earlier with references to FIG. 3 and FIG. 4. In some embodiments, the method is provided using an executable software application which is stored in the firmware memory 528 of the programmable communications device 510 when the device is purchased. In other embodiments, the executable software application is provided by a service provider, using for example an "APP store", and transferred from a network server associated with the service provider to the programmable communications device 510 using the cellular modem 560 or the wireless LAN modem 550 and then stored in the firmware memory 528.

In designate digital camera step 600, the processor 520 in the programmable communications device 510 designates a digital camera 605 from which digital images will be received. In some embodiments, this step is done by initiating a pairing operation during which the programmable communications device 510 detects any digital imaging devices in the vicinity that are capable of sharing digital images. In some embodiments, both the programmable communications device 510 and the digital camera 605 must be simultaneously placed into a pairing mode. In some embodiments, the pairing operation can be initiated from either the programmable communications device 510 or the digital camera 605. In some embodiments, the pairing operation can occur automatically if the programmable communications device 510 detects only one device in the vicinity capable of sharing digital images. In a preferred embodiment, the designate digital camera step 600 only needs to be performed once, and then the programmable communications device 510 can be utilized for repeated sharing operations.

In receive digital images and sharing data step 610, the programmable communications device 510 receives one or more digital images 615 and associated sharing data 620 indicating one or more sharing destinations that the user of the digital camera 605 has designated for the digital images 615. In a preferred embodiment, the digital images 615 and sharing data 620 are received from the digital camera 605 using the wireless LAN modem 550 (FIG. 6) via the wireless communication link 52 (FIG. 6). The digital images 615 may be either digital still images or digital video images or both.

In a transmit digital images to sharing destinations step 625, the programmable communications device 510 transmits the one or more received digital images 615 to the one or more sharing destinations specified by the sharing data 620. In a preferred embodiment, the digital images 615 are transmitted using a wide-area wireless communication system, such as over the cellular communication link 562 using the cellular modem 560.

In some embodiments, the digital images 615 that are received in receive digital images and sharing data step 610 are conditioned in a manner appropriate for a particular sharing destination. This conditioning can include, for example, resizing the digital image, modifying a compression type, modifying a compression level or encoding the digital image using a different file format. For example, the processor 520 may resize the received digital images 615 in order to create a reduced resolution images (i.e., having a smaller number of pixels) for a first sharing destination, such as a Facebook account while maintaining full resolution images to be shared with a second sharing destination, such as a Kodak Gallery account. The processor 520 then transmits the full resolution images to the Kodak Gallery account, and the reduced pixel resolution images to the Facebook account. In some embodiments, information specifying how to condition the digital images for particular sharing destinations is provided in the sharing data 620 received in receive digital images and sharing data step 610. In other embodiments, information specifying how to condition the digital images 615 for particular sharing destinations is provided as part of the "APP", and is stored in firmware memory 528. In some embodiments, the conditioning of the digital images can also include adjusting other image attributes such as sharpness or tone scale and color reproduction attributes according to preferences that can be defined in association with different sharing destinations. For example, if one of the sharing destinations is an E-mail account associated with a particular user, then all images sent to that user can be conditioned according to user-defined preferences for that user.

In some embodiments, a protocol or codec transformation is performed by the processor 520 in the programmable communications device 510, in order to transmit digital video images in a more efficient manner. For example, the processor 520 may reformat the received digital video, in order to create a video that is smaller in size. For example, if the received digital video image uses a Motion JPEG image compression, the digital video may be reformatted using an H.264 image compression. Many Internet sites have video size limits and using a better compression algorithm allows a user to send lengthier video while staying under the upload size limitation. In some embodiments, the information on the video size limit for the sharing destinations is provided in the sharing data 620. In other embodiments, the information on the video size limit for the sharing destinations is provided as part of the "APP", and is stored in firmware memory 528.

Some embodiments may, in response to the network path priority 335 (FIG. 4) or other metric, automatically, or in response to user command, perform a share to a given sharing destination 315 (FIG. 4) in two parts. If the metric for sharing is currently above some threshold, the digital camera 10A may apply a transformation to the image to lower the cost of the share. For example, rather than transmit an entire digital video, the digital camera 10A may transmit instead a digital still image representing the digital video, or a condensed digital video constructed by applying any of the various video summarization algorithms known in the art. For a digital still image, the digital camera 10A may down-sample the digital image to a degree beyond any down-sampling that would normally be associated with the sharing destination 315. At a subsequent time, when the cost of transmission has gone below some threshold, the sharing process can be completed in its original intent to the sharing destination 315. This behavior of sending a summary representation may be carried out automatically by the digital camera 10A in response to a user preference setting. Alternatively, the digital camera 10A may prompt the user before sending a summary representation. The digital camera 10A may give the user the choice of sending only a summary representation, sending a summary representation now with the normal shared representation deferred, or deferring the entire share operation until such a time as the cost of transmission goes below the threshold.

Figure 8:
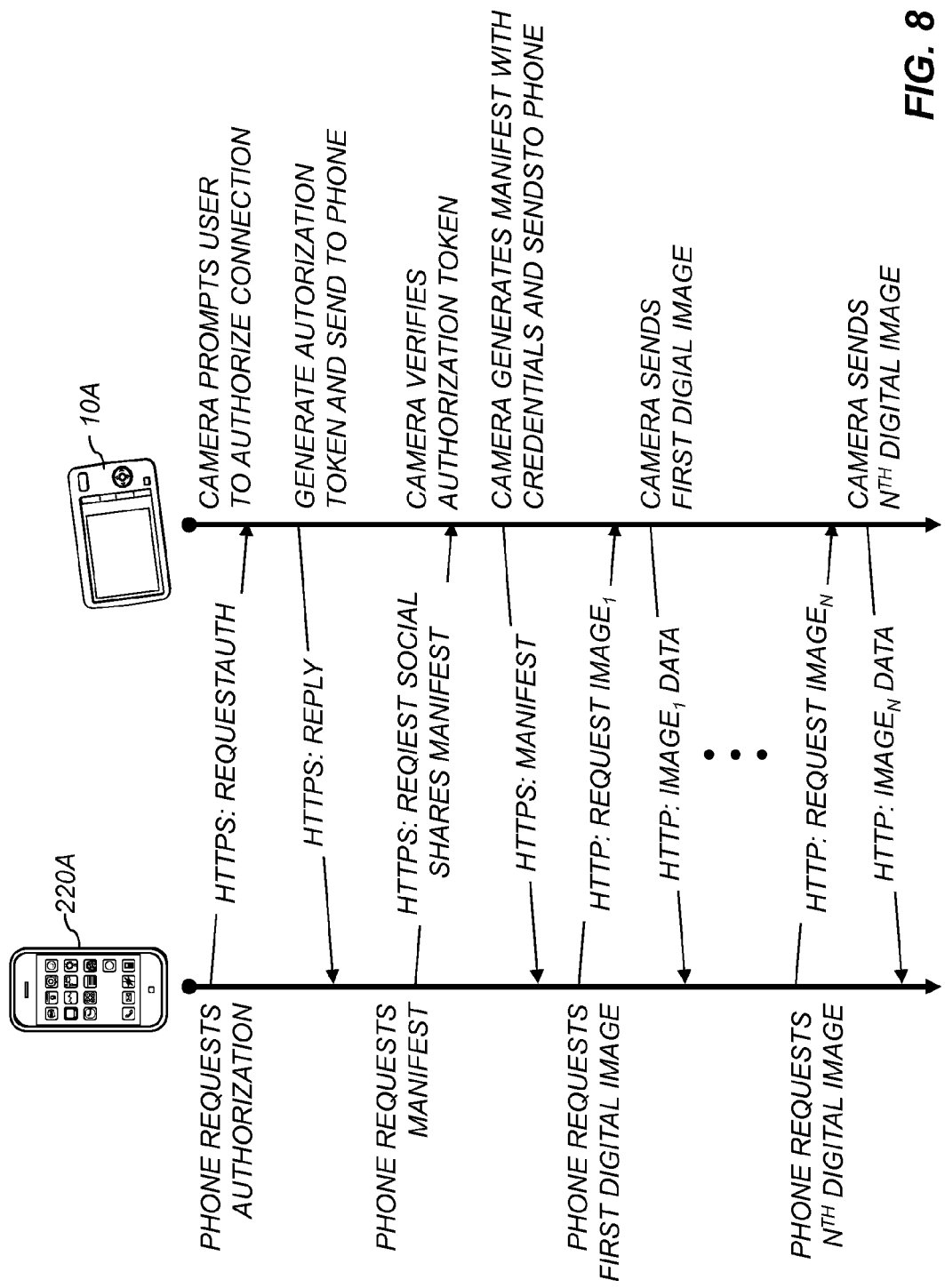
FIG. 8 is a diagram illustrating a process for transmitting digital images and sharing data from a digital camera to a programmable communication device in accordance with an embodiment of the present invention.

FIG. 8 is a diagram illustrating more details of a particular embodiment of a method for sharing digital images 615 (FIG. 7) from digital camera 10A to sharing destinations specified by associated sharing data 620 (FIG. 7) via a network pathway using a particular smart phone 220A (as in FIG. 3). It will be obvious to one skilled in the art that similar process can be applied for the other devices shown in FIG. 3.

In some embodiments, in order to facilitate pairing, the digital camera 10A maintains a list of nodes that are authorized to communicate with the digital camera 10A. For each authorized node, the digital camera 10A stores relevant information pertaining to the node. In a preferred embodiment, the node information includes a GUID (globally unique ID), as well as a friendly name (e.g., a nickname) for the node, a hashed representation of the authorization token assigned to that node, and the type of pairing. In some embodiments, for each node that is authorized for permanent pairing the digital camera 10A stores the node information in the firmware memory 28 (FIG. 1). Information pertaining to nodes that are granted guest/one-time access can be erased after the current wireless session and does not need to be stored in the firmware memory 28.

In some embodiments, smart phone 220A, on its first contact with the digital camera 10A, requests authorization to pair with the digital camera 10A, communicating with the digital camera 10A using HTTPS. The digital camera 10A and smart phone 220A are not required to authenticate each other as part of this exchange, however. In particular, the digital camera 10A is not required to provide authorization to the smart phone 220A.

In some embodiments, the digital camera 10A, upon receipt of a request from an unknown smart phone 220A, asks the user of the digital camera 10A to authorize a connection to the smart phone 220A. The user interface elements displayed on the image display 32 (FIG. 1) of the digital camera 10A can enable the user to choose between different options, such as (i) allowing the smart phone 220A to pair with the digital camera 10A, (ii) allowing only a temporary connection between the smart phone 220A and the digital camera 10A for the purpose of receiving and sharing one set of digital image, and (iii) rejecting the connection between the smart phone 220A and the digital camera 10A. If the user chooses (iii) to reject the connection, then the digital camera 10A sends a message to the smart phone 220A with an appropriate rejection status code. If the user chooses (i) or (ii) to accept the connection, then the digital camera 10A generates a 128-bit authorization token and sends it to the smart phone 220A in a reply message together with an indication of whether or not the smart phone 220A is permanently paired or simply authorized for a one-time connection. The digital camera 10A also adds this node to the list of authorized nodes. If the user chooses (i) to accept the connection as a permanent pairing, then the digital camera 10 also stores this node information in the firmware memory 28.

In the illustrated embodiment, the smart phone 220A sends a manifest request to the digital camera 10A using HTTPS. This request includes the authorization token that it received from the digital camera 10A. The digital camera 10A then receives the manifest request, and verifies that the included authorization token matches the expected token by comparing the hashed representation of the token in the request with the stored representation. If they do not match, the digital camera 10A transmits an authorization error to the smart phone 220A, and optionally indicates this to the user on the image display 32 (FIG. 1) of the digital camera 10A. If the authorization token matches, the digital camera 10A then generates the manifest, including the credentials in the XML by base64 encoding them, and transmits the manifest to the smart phone 220A using HTTPS.

The smart phone 220A then extracts the credentials from the manifest, decoding them using the base64 decoding. The smart phone 220A then requests the first digital image asset to be shared with a sharing destination, and the digital camera 10A responds by sending the first digital image asset to the smart phone 220A. This continues until all of the digital image assets that are to be shared have been transferred from the digital camera 10A to the smart phone 220A. In some embodiments, the sharing data associated with each digital image asset can be sent to the smart phone 220A together with the digital image asset. In other embodiments the sharing data can be sent as part of the earlier transmitted manifest. In some embodiments, the sharing data is provided using an "Auto Transfer" file as defined in the well-known DPOF 1.1 standard.

Once the digital image assets have been received by the smart phone 220A, the application software in the smart phone 220A will proceed to transmit the digital images to the sharing destinations specified by the associated sharing data. For example, the smart phone 220A can open a cellular communication link 562 to the Internet using cellular modem 560, and can then transmit the digital images to the respective sharing destinations. It may also use an available Wi-Fi network that has Internet connectivity.

The invention has been described in detail with particular reference to certain preferred embodiments thereof, but it will be understood that variations and modifications can be effected within the spirit and scope of the invention.

PARTS LIST 2 flash
4 lens
6 adjustable aperture and adjustable shutter
8 zoom and focus motor drives
10 digital camera
10A digital camera
10B digital camera
12 timing generator
14 image sensor
16 ASP and A/D Converter
18 buffer memory
20 processor
22 audio codec
24 microphone
26 speaker
28 firmware memory
30 image memory
32 image display
34 user controls
36 display memory
38 wired interface
40 computer
40A wireless-accessible computer
44 video interface
46 video display
48 interface/recharger
50 wireless modem
52 wireless communication link
58 wireless network
70 Internet
90 white balance setting
95 white balance step
100 color sensor data
105 noise reduction step
110 noise reduction setting
115 demosaicing step
120 resolution mode setting
125 color correction step
130 color reproduction setting
135 tone scale correction step
140 contrast setting
145 image sharpening step
150 sharpening setting
155 image compression step
160 compression setting
165 file formatting step
170 metadata
175 mode settings
180 digital image file
185 camera settings
200 digital imaging system
210 wireless network pathways
220A smart phone
220B smart phone
230 wireless router
240 wireless hotspot
250 sharing destinations
252 social networking site
254 E-mail address
256 image sharing site
258 image storage device
270 tablet computer
300 capture digital image step
305 digital image
310 select sharing destination step
315 sharing destination
320 identify network pathways step
325 network pathways
330 determine network pathway priorities step
335 network pathway priorities
340 select network pathway step
345 selected network pathway
350 transmit digital image step
400 network pathway table
410 home PC network pathway
412 wireless router network pathway
414A hotspot #1 network pathway
414B hotspot #2 network pathway
416 smart phone network pathway
418 tablet network pathway
504 lens
506 digital camera module
510 programmable communications device
512 timing generator
514 image sensor
516 ASP and A/D Converter
518 buffer memory
520 processor
522 audio codec
524 microphone
526 speaker
528 firmware memory
530 image memory
532 image display
534 user controls
536 display memory
540 GPS sensor
550 wireless LAN modem
560 cellular modem
562 cellular communication link
600 designate digital camera step
605 digital camera
610 receive digital images and sharing data step
615 digital images
620 sharing data
625 transmit digital images to sharing destinations step

The invention claimed is:

1. An image capture device comprising:
a processing system configured to:
capture a digital image of a scene;
receive a selection of a sharing destination;
identify a plurality of network pathways for communication with the sharing destination, wherein the plurality of network pathways include intermediate nodes for archiving and relaying the digital image;
determine a priority for each of the network pathways based at least in part on processing capabilities of the intermediate nodes;
determine that a constraint specifying a data transmission cost limit or a priority limit is associated with a recipient at the sharing destination;
defer the transmission of the digital image for a period of time based on the determination that none of the network pathways satisfy the constraint;
after the period of time, select a highest priority network pathway that satisfies the constraint; and
transmit the digital image to the sharing destination using the highest priority network pathway.

2. The image capture device of claim 1, wherein the highest priority network pathway uses near field communication.

3. The image capture device of claim 1, wherein an authorization process is required to connect to the highest priority network pathway.

4. The image capture device of claim 1, wherein the priority is determined responsive to estimated data transfer rates or estimated transmission times associated with the identified network pathways.

5. The image capture device of claim 1, wherein the priority is determined responsive to estimated data transmission costs associated with the identified network pathways.

6. The image capture device of claim 1, wherein the priority is determined responsive to an estimated power usage associated with the identified network pathways.

7. The image capture device of claim 1, wherein the processing system is further configured to:
receive a selection of a plurality of sharing destinations;
determine that a different constraint specifying a data transmission cost limit or a priority limit is associated with each respective sharing destination of the plurality of sharing destinations, wherein each different constraint imposes a different data transmission cost limit or a different priority limit on a respective sharing destination; and
defer the transmission of the digital image to each respective sharing destination in accordance with the respective constraint associated with each respective sharing destination.

8. The image capture device of claim 1, wherein the processing system is further configured to:
transmit a summary representation of the digital image to the sharing destination in a first part based at least on the determined constraint; and
transmit the digital image to the sharing destination in a second part based at least on the determined constraint, the transmission of the second part being deferred until such a time that a network pathway is identified that satisfies the constraint.

9. The image capture device of claim 1, wherein the priority is determined responsive to user-specified preferences.

10. The image capture device of claim 1, wherein the digital image is transmitted to an intermediate node on the network pathway, and wherein the intermediate node transmits the digital image to a plurality of sharing destinations.

11. The image capture device of claim 10, wherein the digital image is transmitted to the intermediate node by a local-area wireless communication system, and wherein the intermediate node is configured to transmit the digital image to the plurality of shared destinations by a wide-area wireless communication system.

12. The image capture device of claim 10, wherein the intermediate node is configured to designate the image capture device as a device from which digital images will be received.

13. The image capture device of claim 10, wherein the intermediate node is configured to transmit a modified digital image to a first shared destination, wherein the modified digital image is modified based on at least requirements of the shared destination, and wherein the requirements are based at least on one of a size, compression type, compression level, or encoding type of the digital image.

14. The image capture device of claim 1, wherein the processing system is further configured to: delay the transmission of the digital image based at least on no network pathways being available.

15. The image capture device of claim 1, wherein the sharing destination is automatically determined based on analyzing the digital image using a person recognition process.

16. The image capture device of claim 1, wherein the processing system is further configured to:
maintain a list of nodes that are authorized to communicate with the image capture device;
store information associated with each of the nodes, wherein the information comprises an authorization token assigned to each of the nodes;
identify the plurality of network pathways between the image capture device and the nodes; and
authenticate the highest priority network pathway with the authorization token.

17. A method comprising:
capturing, by a processing system, a digital image of a scene;
receiving, by the processing system, a selection of a sharing destination;
identifying, by the processing system, a plurality of network pathways for communication with the sharing destination, wherein the plurality of network pathways include intermediate nodes for archiving and relaying the digital image;
determining, by the processing system, a priority for each of the network pathways based at least in part on processing capacities of the intermediate nodes;
determining, by the processing system, that a constraint specifying a data transmission cost limit or a priority limit is associated with a recipient at the sharing destination;
deferring, by the processing system, the transmission of the digital image for a period of time based on the determination that none of the network pathways satisfy the constraint;
after the period of time, selecting, by the processing system, a highest priority network pathway that satisfies the constraint; and
transmitting, by the processing system, the digital image to the sharing destination using the highest priority network pathway.

18. The method of claim 17, wherein the priority is determined based on estimated data transfer rates or estimated transmission times associated with the identified network pathways.

19. The method of claim 17, wherein the determining that a constraint specifying a data transmission cost limit or a priority limit is associated with a recipient at the sharing destination comprises prioritizing a predetermined sharing destination over other sharing destinations.

20. The method of claim 17, wherein the determining that a constraint specifying a data transmission cost limit or a priority limit is associated with a recipient at the sharing destination comprises determining whether to ignore the data transmission cost limit or the priority limit based on the recipient or the sharing destination.

21. A non-transitory computer readable medium having instructions stored thereon, the instructions comprising:
   instructions to capture a digital image of a scene;
   instructions to receive a selection of a sharing destination;
   instructions to identify a plurality of network pathways for communication with the sharing destination, wherein the plurality of network pathways include intermediate nodes for archiving and relaying the digital image;
   instructions to determine a priority for each of the network pathways based at least in part on processing capacities of intermediate nodes;
   instructions to determine that a constraint specifying a data transmission cost limit or a priority limit is associated with a recipient at the sharing destination;
   instructions to defer the transmission of the digital image for a period of time based on the determination that none of the network pathways satisfy the constraint;
   instructions to, after the period of time, select a highest priority network pathway that satisfies the constraint; and
   instructions to transmit the digital image to the sharing destination using the highest priority network pathway.

* * * * *